United States Patent
Miller et al.

(10) Patent No.: US 10,303,176 B2
(45) Date of Patent: May 28, 2019

(54) DETERMINING VARIANCE FACTORS FOR COMPLEX ROAD SEGMENTS

(71) Applicant: Ford Global Technologies, LLC, Dearborn, MI (US)

(72) Inventors: Kenneth James Miller, Canton, MI (US); Douglas Raymond Martin, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 242 days.

(21) Appl. No.: 14/883,741

(22) Filed: Oct. 15, 2015

(65) Prior Publication Data

US 2017/0108870 A1    Apr. 20, 2017

(51) Int. Cl.
*G05D 1/02* (2006.01)
*G01C 21/34* (2006.01)

(52) U.S. Cl.
CPC ....... *G05D 1/0223* (2013.01); *G01C 21/3492* (2013.01); *G05D 1/0221* (2013.01); *G05D 2201/0213* (2013.01)

(58) Field of Classification Search
CPC ......... G05D 1/0223; G05D 2201/0213; G05D 1/0276; G05D 1/0221; G01C 21/3492; G08G 1/096725; G08G 1/0112; G08G 1/0129; G08G 1/012; G08G 1/0133; G08G 1/0141; G08G 1/0145; B60W 30/143

See application file for complete search history.

(56) References Cited

U.S. PATENT DOCUMENTS

| | | | | |
|---|---|---|---|---|
| 5,539,645 | A * | 7/1996 | Mandhyan | G08G 1/0104 340/905 |
| 5,901,806 | A | 5/1999 | Takahashi | |
| 8,478,499 | B2 | 7/2013 | Rupp et al. | |
| 8,880,272 | B1 | 11/2014 | Ferguson et al. | |
| 9,176,500 | B1 * | 11/2015 | Teller | G05D 1/0088 |
| 9,566,986 | B1 * | 2/2017 | Gordon | B60W 50/12 |

(Continued)

FOREIGN PATENT DOCUMENTS

| CN | 102556075 A | 7/2012 |
|---|---|---|
| CN | 102673569 A | 9/2012 |

(Continued)

OTHER PUBLICATIONS

GB Search Report, Appl No. GB1617250.4 dated Mar. 14, 2017; 4 pages.

(Continued)

*Primary Examiner* — Thomas G Black
*Assistant Examiner* — Sze-Hon Kong
(74) *Attorney, Agent, or Firm* — Frank A. MacKenzie; Bejin Bieneman PLC (57) ABSTRACT

A vehicle computing device includes a data storage medium and a processing circuit. The processing circuit is programmed to receive from the data storage medium, a vehicle characteristic associated with an autonomous vehicle, receive historical data associated with the vehicle characteristic at a first road segment, determine a correction factor for the autonomous vehicle based at least in part on the historical data, and apply the correction factor to the vehicle characteristic to operate the autonomous vehicle in accordance with the historical data.

20 Claims, 5 Drawing Sheets

(56) References Cited

U.S. PATENT DOCUMENTS

| | | | |
|---|---|---|---|
| 9,847,024 B2* | 12/2017 | Witte | G08G 1/096725 |
| 2006/0293825 A1* | 12/2006 | Sporl | B60W 10/06 |
| | | | 701/93 |
| 2007/0078584 A1* | 4/2007 | Nakamura | B60T 7/22 |
| | | | 701/93 |
| 2007/0208496 A1 | 9/2007 | Downs et al. | |
| 2008/0186154 A1* | 8/2008 | Haug | B60W 50/14 |
| | | | 340/435 |
| 2011/0029184 A1 | 2/2011 | Brighenti | |
| 2011/0106416 A1* | 5/2011 | Scofield | G08G 1/0104 |
| | | | 701/119 |
| 2012/0283942 A1* | 11/2012 | T'Siobbel | G01C 21/26 |
| | | | 701/410 |
| 2013/0154854 A1* | 6/2013 | Chen | G08G 1/096741 |
| | | | 340/905 |
| 2013/0173153 A1* | 7/2013 | Hayashida | G08G 1/0112 |
| | | | 701/527 |
| 2013/0226622 A1* | 8/2013 | Adamson | G06Q 40/08 |
| | | | 705/4 |
| 2013/0253797 A1 | 9/2013 | McNew | |
| 2013/0282264 A1* | 10/2013 | Bastiaensen | G01C 21/3492 |
| | | | 701/119 |
| 2014/0018106 A1* | 1/2014 | Fulger | G01C 21/3415 |
| | | | 455/456.3 |
| 2014/0244125 A1* | 8/2014 | Dorum | G01C 21/32 |
| | | | 701/70 |
| 2014/0379171 A1* | 12/2014 | Kim | G07C 5/008 |
| | | | 701/2 |
| 2015/0088335 A1* | 3/2015 | Lambert | G08G 1/162 |
| | | | 701/1 |
| 2015/0106007 A1* | 4/2015 | Matsumura | B60W 30/143 |
| | | | 701/408 |
| 2015/0161894 A1* | 6/2015 | Duncan | G08G 1/163 |
| | | | 701/1 |
| 2015/0203108 A1* | 7/2015 | Loria | B60W 50/0098 |
| | | | 701/93 |
| 2015/0262480 A1* | 9/2015 | Fowe | G01C 21/3492 |
| | | | 701/117 |
| 2015/0336587 A1* | 11/2015 | Inoue | B60W 50/087 |
| | | | 701/41 |
| 2016/0049079 A1* | 2/2016 | Ibrahim | G08G 1/005 |
| | | | 340/944 |
| 2016/0153804 A1* | 6/2016 | Fowe | G08G 1/0104 |
| | | | 701/118 |
| 2016/0171889 A1* | 6/2016 | Park | G08G 1/096725 |
| | | | 701/93 |
| 2016/0311431 A1* | 10/2016 | Kato | B62D 1/28 |
| 2016/0334796 A1* | 11/2016 | Inoue | G05D 1/0278 |
| 2016/0364983 A1* | 12/2016 | Downs | G08G 1/0108 |
| 2016/0379488 A1* | 12/2016 | Fowe | G08G 1/0112 |
| | | | 701/119 |
| 2017/0004707 A1* | 1/2017 | Fowe | G08G 1/0133 |
| 2017/0017235 A1* | 1/2017 | Tanaka | G05D 1/0027 |
| 2017/0061793 A1* | 3/2017 | Witte | G08G 1/012 |
| 2017/0232974 A1* | 8/2017 | Nishida | G05D 1/0061 |
| | | | 701/24 |
| 2017/0255966 A1* | 9/2017 | Khoury | G08G 1/0129 |
| 2017/0267286 A1* | 9/2017 | Takamatsu | B60W 50/16 |
| 2018/0052458 A1* | 2/2018 | Tsuji | G05D 1/0061 |
| 2018/0058879 A1* | 3/2018 | Tayama | B60K 35/00 |
| 2018/0118029 A1* | 5/2018 | Koebler | B60K 35/00 |
| 2018/0126987 A1* | 5/2018 | Burford | B60W 30/143 |
| 2018/0130095 A1* | 5/2018 | Khoury | G06Q 30/0205 |
| 2018/0304891 A1* | 10/2018 | Heidenreich | G01C 21/3602 |

FOREIGN PATENT DOCUMENTS

| | | |
|---|---|---|
| DE | 102011112990 A1 | 3/2013 |
| EP | 1302356 A1 | 4/2003 |
| GB | 2286905 A | 8/1995 |
| JP | H03273405 A | 12/1991 |

OTHER PUBLICATIONS

Pending U.S. Appl. No. 14/632,040, filed Feb. 26, 2015. Specification and drawings, filed herewith.

* cited by examiner

DETERMINING VARIANCE FACTORS FOR COMPLEX ROAD SEGMENTS

BACKGROUND

Autonomous vehicles relieve the driver of certain driving tasks. For instance, autonomous vehicles can control certain lateral and longitudinal aspects of operating a vehicle. An example of a lateral aspect includes steering the vehicle. An example of a longitudinal aspect includes controlling the vehicle speed. Some autonomous vehicles are controlled in a way that mimics a human driver. One way to mimic a human driver is to steer the vehicle and control the vehicle speed in the same way a human driver would.

DETAILED DESCRIPTION

Human drivers usually operate a vehicle in a predictable way, especially when manually accelerating, decelerating, and steering a vehicle. Autonomous vehicles, therefore, can be programmed to control vehicle speed and steering in a way that feels like a human is driving. By doing so, passengers may feel more confident that the autonomous vehicle is operating properly.

An example autonomous vehicle that can mimic a human driver includes a computing device, having a data storage medium and a processing circuit, programmed to receive a vehicle characteristic, such as speed or steering angle, associated with the autonomous vehicle, determine a nominal value from historical data, for the vehicle characteristic at a road segment, determine a correction factor, and apply the correction factor to the vehicle characteristic to autonomously operate the autonomous vehicle in accordance with the nominal value and standard deviation. The nominal value may be determined from crowd-sourced data transmitted by other vehicles traversing the same road segment. Moreover, the crowd-sourced vehicle data may be used to more accurately determine estimated travel times involving the same road segment.

Using vehicle speed profiles, the vehicle can anticipate and adjust forward vehicle speeds. A variance factor and aggressiveness factor can be determined as a function of the present vehicle speed and the nominal speed and standard deviation of crowd-sourced vehicle speeds. The crowd-sourced vehicle speed data for a particular road segment can be aggregated, and the size of the road segment can be adjusted depending on, e.g., the fidelity of the road segment data and computational power. Thus, very small road segments may provide a more accurate and more continuous velocity profile.

The magnitude of the variance (i.e., the difference between the present speed and the nominal speed for the road segment) can be evaluated by determining a percent error relative to the standard deviation, the nominal speed, or both. This variance may be used as a non-linear feedback correction so that, e.g., if the present vehicle speed is a full standard deviation from the nominal speed (i.e., 100% variance), the vehicle may correct the speed more aggressively than if the variance were smaller (e.g., 10%). The aggressiveness factor may define the aggressiveness of the response. Thus, the aggressiveness factor may be a function of percentage variance.

Further, velocity data for upcoming road segments can be used to create a feedforward velocity profile. The vehicle can compare expected velocities (based on it's present variance in velocity determined from vehicle sensors, etc.) to the speed profiles for the upcoming road segments to determine the variance at each road segment. The vehicle may use these variances as a feedforward correction to adjust the vehicle speed to operate closer to the nominal value by the time the vehicle reaches the upcoming road segments.

Although discussed in the context of speed control, similar approaches may be taken with regard to other autonomous vehicle systems such as steering control.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
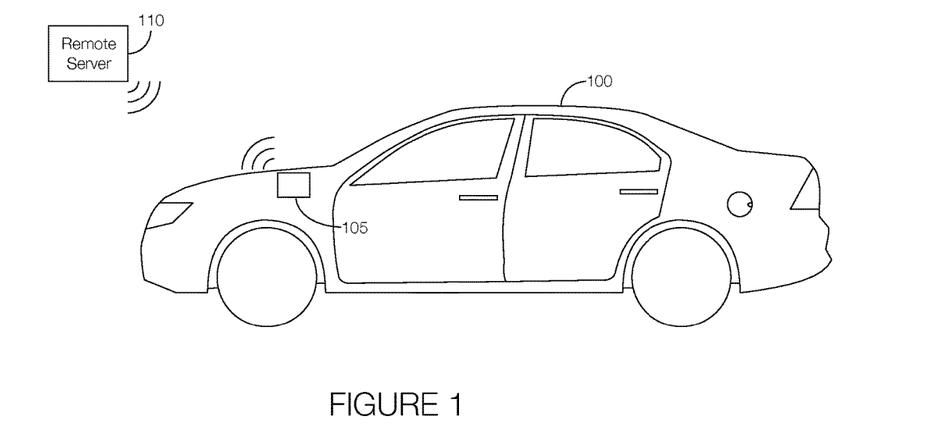
FIG. 1 illustrates an example vehicle with an autonomous control system that uses crowd-sourced data about road segments to autonomously control the vehicle.

As illustrated in FIG. 1, a host vehicle 100 includes a vehicle system 105, including a computing device, that uses crowd-sourced data about road segments to autonomous control the host vehicle 100. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 can operate in an autonomous (e.g., driverless) mode, a partially autonomous mode, and/or a non-autonomous mode.

The vehicle system 105 receives data from one or more vehicle subsystems. The data may represent a vehicle characteristic such as vehicle speed. The vehicle system 105 may further receive crowd-sourced data from a remote source such as a remote server 110. The crowd-sourced data may be stored in a database that relates vehicle characteristics received from other vehicles to a particular road segment. The remote server 110 may process the vehicle characteristics to determine a nominal value. The nominal value may include, e.g., an average characteristic (such as an average speed) of the vehicles that have traveled through that particular road segment. The remote server 110 may further process the vehicle characteristics to determine a standard deviation relative to the nominal value. The nominal value, the standard deviation, or both may also be stored in the database.

The remote server 110 may wirelessly communicate the nominal value, the standard deviation, or both, to the vehicle system 105. In one possible approach, the vehicle system 105 may query the database for the nominal value, standard deviation, or both. The query may include the present location of the host vehicle 100, and the remote server 110 may associate the present location to a road segment and respond to the query with the nominal value and standard deviation associated with the corresponding road segment, and associated with multiple road segments in the direction the vehicle is headed. Alternatively, the remote server 110 may be programmed to receive the location of the host vehicle 100 and automatically provide the nominal value and standard deviation to the host vehicle 100.

With the data from the remote server 110, the vehicle system 105 may compare the present vehicle characteristic to the nominal value to determine a variance. The variance may be described as a percentage of the magnitude of the vehicle characteristic relative to the nominal value and standard deviation. In some instances, the variance may be the absolute value of the magnitude of the vehicle characteristic relative to the nominal value and the standard deviation. One way to define variance is shown below in Equation (1):

$$\text{Var} = \frac{C_{current} - C_{nominal}}{\sigma} \times 100 \quad (1)$$

Where Var is the variance as a percentage, $C_{current}$ is the current vehicle characteristic, $C_{nominal}$ is the nominal value for the vehicle characteristic at the road segment where the host vehicle 100 is located, and $\sigma$ is the standard deviation.

Using speed as an example, if the current vehicle speed ($C_{current}$) is 40 mph, the nominal speed ($C_{nominal}$) is 35 mph, and the standard deviation ($\sigma$) is 5 mph, the variance is 100% since the current vehicle speed is one standard deviation above the nominal speed. If the vehicle speed were lowered to 37 mph, the variance would fall to 40%.

Moreover, the variance may exceed 100% if, e.g., the current speed is greater than the nominal value plus one standard deviation. Also, a negative variance may be possible if e.g., the current vehicle speed is below the nominal value, and may be lower than −100% if e.g., the current vehicle speed is more than one standard deviation below the nominal value.

With the variance determined, the vehicle system 105 can determine a correction factor, which may define the amount of correction needed to move the vehicle characteristic closer to the nominal value. The correction factor may be a non-linear function of the variance. For instance, the correction factor for a relatively high variance (e.g., >80%) may cause the host vehicle 100 to quickly decelerate toward the nominal value while the correction factor for a relatively low variance (e.g., <10%) may cause the host vehicle 100 to decelerate slowly, or not at all if deemed acceptable, toward the nominal value. The vehicle system 105 may apply the correction factor to autonomously operate the host vehicle 100 in accordance with the variance and the nominal value. Since the nominal value is based on crowd-sourced data, operating the host vehicle 100 in accordance with the nominal value may cause the host vehicle 100 to feel more like a human-driven vehicle than an autonomously driven vehicle.

Figure 2:
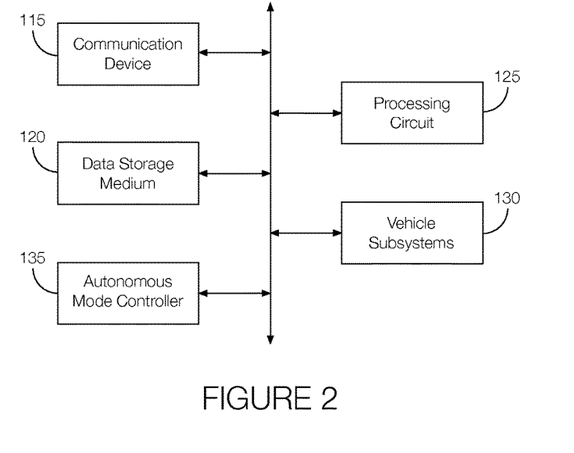
FIG. 2 is a block diagram of example components that may be incorporated into the system of FIG. 1.

FIG. 2 is a block diagram of example components that may be incorporated into the vehicle system 105. As shown, the vehicle system 105 includes a communication device 115, a data storage medium 120, and a processing circuit 125.

The communication device 115 may include any combination of components, circuits, or both, that facilitate wireless communication between the vehicle system 105 and the remote server 110. The communication device 115 may be configured for wireless communication and may be programmed to generate and receive signals according to any number of wireless telecommunications protocols. The communication device 115 may be programmed to transmit data received from the remote server 110 to the data storage medium 120, the processing circuit 125, or both. For instance, the communication device 115 may be programmed to receive a present location of the host vehicle 100 from a vehicle subsystem 130, such as a navigation system, and transmit the vehicle location to the remote server 110. The communication device 115 may be programmed to receive the nominal value and standard deviation associated with the present location of the host vehicle 100 from the remote server 110.

The data storage medium 120 may be programmed to store data received from, e.g., the communication device 115. In one possible approach, the data storage medium 120 may be further programmed to store computer-executable instructions that may be carried out by, e.g., the processing circuit 125. The data storage medium 120 may therefore include a volatile storage medium, a non-volatile storage medium, or both.

The processing circuit 125 may include any number of components configured or programmed to access the data stored in the data storage medium 120, including executing computer-executable instructions stored in the data storage medium 120. For instance, the processing circuit 125 may be programmed to receive a vehicle characteristic from a vehicle subsystem 130. As discussed above, the vehicle characteristic may include a magnitude value, such as the present speed of the host vehicle 100.

The processing circuit 125 may be further programmed to receive the nominal value and standard deviation for the present vehicle location from the communication device 115 and determine the correction factor based on the vehicle characteristic relative to the nominal value and standard deviation. For instance, the processing circuit 125 may be programmed to determine the correction factor by determining the variance (see Equation 1) and then identifying a correction factor associated with the variance. As discussed above, the correction factor may be a non-linear function of the variance. For instance, the correction factor for a relatively high variance (e.g., >80%) may be exponentially greater than the correction factor for a relatively low variance (e.g., <10%).

The processing circuit 125 may be programmed to apply the correction factor by, e.g., outputting a control signal to one or more vehicle subsystems 130, such as an autonomous mode controller 135. The control signal may be used to autonomously operate the host vehicle 100 in accordance with the nominal value, which as discussed above is crowd-sourced from other vehicles that have driven on the same road segment as the present location of the host vehicle 100. Moreover, because the correction factor is a non-linear function of the variance, applying the correction factor associated with a relatively high variance may, e.g., cause the host vehicle 100 to quickly decelerate toward the nominal value while applying the correction factor associated with a relatively low variance may, e.g., cause the host vehicle 100 to decelerate slowly toward the nominal value.

The same may be true for accelerating. A correction factor associated with a more aggressive acceleration may be used if the variance is, e.g., below −80% and a correction factor associated with a less aggressive acceleration may be used if the variance is higher (e.g., greater than −10%).

The processing circuit 125 may be programmed to determine the nominal value and standard deviation based on historical data. The historical data may be captured from other data sharing vehicles via i.e., vehicle to vehicle (V2V) or vehicle to infrastructure (V2I) communication or when the host vehicle 100 was previously driven in a manual (i.e., non-autonomous) mode on a particular road segment. Alternatively or in addition, the historical data may be stored in the remote server 110 and transmitted to the vehicle system 105 for processing by the processing circuit 125. That is, the communication device 115 may transmit the current vehicle location to the remote server 110, the remote server 110 may transmit the historical data associated with the road segment associated with the current vehicle location, and the processing circuit 125 may receive and process the historical data to determine the nominal value and standard deviation.

The vehicle system 105 may be further programmed to operate the host vehicle 100 according to future road segments. For instance, the processing circuit 125 may receive or otherwise determine nominal values for the present road segment and at least one future road segment, referred to as the present nominal value and the future nominal value, respectively. Moreover, the processing circuit 125 may be programmed to receive or otherwise determine the standard deviations associated with the present and future nominal values. The processing circuit 125 may be programmed to predict future vehicle characteristics as well, including, e.g., a future vehicle speed. The processing circuit 125 may be programmed to determine variances based on the predicted vehicle speed relative to the future nominal values and corresponding standard deviations. The processing circuit 125 may apply a correction factor to control the host vehicle 100 so that the vehicle characteristic remains relatively close to the nominal value as the nominal value changes from segment to segment. An additional discussion is below with respect to FIG. 7.

Figure 3:
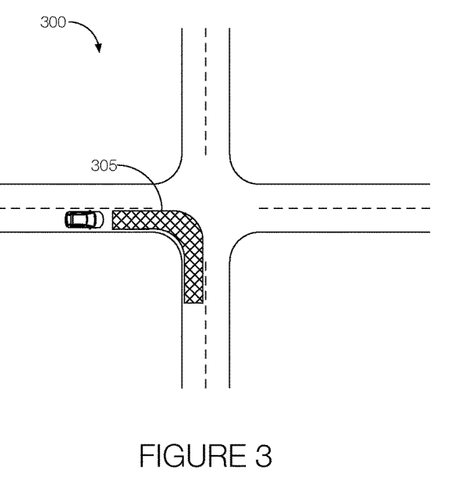
FIG. 3 is a diagram of an example road segment, including a present road segment.
Figure 4:
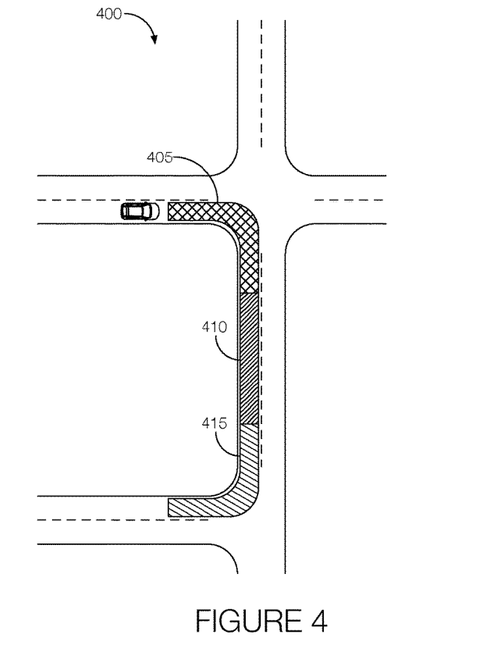
FIG. 4 is a diagram of an example group of road segments, including a present road segment and multiple future road segments.

FIGS. 3 and 4 are diagrams showing example road segments. In FIG. 3, the diagram 300 illustrates a present road segment 305 based on the present location of the host vehicle 100. As the host vehicle 100 approaches the road segment 305, the host vehicle 100 may transmit its location to the remote server 110. As discussed above, the remote server 110 may transmit the nominal value and standard deviation associated with the road segment 305 in response to receiving the vehicle location. Thus, even though the road segment 305 is described as the "present" road segment, the host vehicle 100 may not actually be on that road segment yet to give time for the host vehicle 100 to communicate its location, for the remote server 110 to respond, and for the host vehicle 100 to process the data received from the remote server 110 prior to arriving at the "present" road segment.

In FIG. 4, the diagram 400 illustrates a present road segment 405 and two future road segments 410, 415. As the host vehicle 100 approaches the road segment 405, the host vehicle 100 may transmit its location to the remote server 110 and the remote server 110 may transmit the nominal value and standard deviation associated with the present road segment 405 and one or more future road segments 410, 415 in response to receiving the vehicle location. The vehicle system 105 may control the host vehicle 100 in a way that accounts for the nominal values and standard deviations for each road segment as discussed above. As with the implementation shown in FIG. 3, the host vehicle 100 may not yet be at the present road segment 405 when the host vehicle 100 location is transmitted and the nominal values and standard deviations received.

Figure 5:
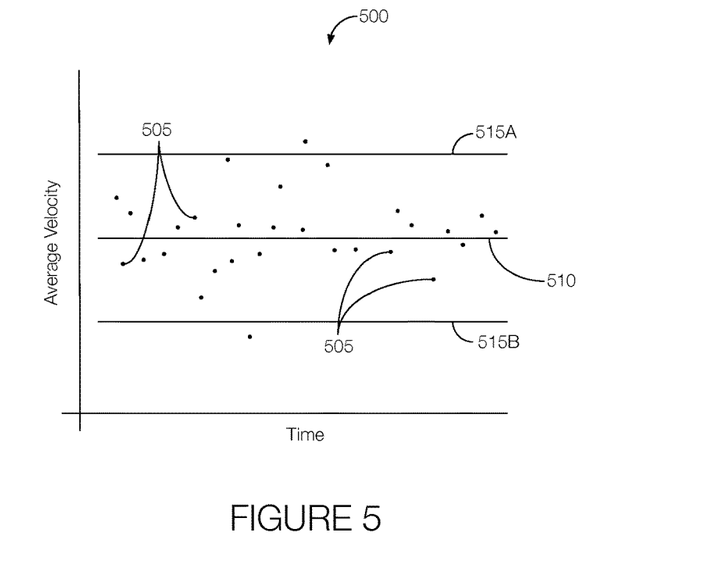
FIG. 5 is a graph illustrating example crowd-sourced data and a nominal value determined from the data for a particular road segment.

FIG. 5 is a graph 500 illustrating example crowd-sourced data and a nominal value and standard deviation value determined from the data for a particular road segment. The x-axis represents a time at which a vehicle drove on a particular road segment. The y-axis represents the magnitude of the vehicle characteristic (e.g., average speed). The dots (collectively shown at 505; only a few of which are numbered for purposes of simplicity) may illustrate the vehicle characteristics sampled from vehicles travelling on the road segment. For example, each dot 505 may represent the average speed of a particular vehicle traveling on the road segment. Thus, the dots 505 may represent the historical data discussed previously. The line 510 may represent the nominal value, which in this instance may refer to the average speed of all vehicles travelling on that road segment. The lines 515 may represent the standard deviation relative to the nominal value. Two standard deviation lines 515 are shown. One line 515A is shown at one standard deviation about the nominal value 510 and the other line 515B is shown one standard deviation below the nominal value 510.

Figure 6:
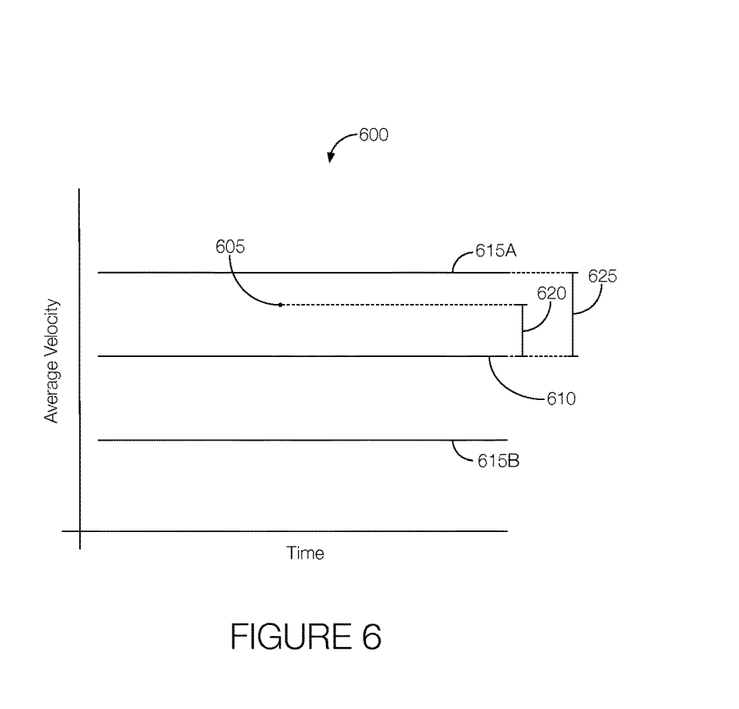
FIG. 6 is a graph illustrating a variance of a present vehicle characteristic to the nominal value.

FIG. 6 is a graph 600 illustrating a variance of a present vehicle characteristic to the nominal value. The dot 605 illustrates the present vehicle characteristic for the host vehicle 100. For instance, the dot 605 may represent the present average speed of the host vehicle 100 on a road segment. The line 610 may represent the nominal value based on, e.g., historical data, and the lines 615A and 615B may represent one standard deviation above and below, respectively, the nominal value 605. The line 620 may represent the difference between the present vehicle characteristic 605 and the nominal value 610, and the line 625 may represent the magnitude of the standard deviation. The variance can be determined from the magnitudes represented by lines 620 and 625 where the line 620 represents the numerator of Equation (1) and line 625 represents the denominator of Equation (1).

Figure 7:
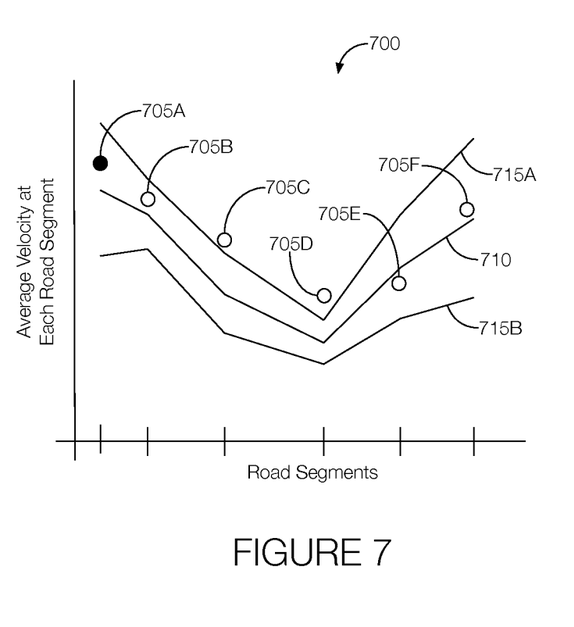
FIG. 7 is a graph illustrating how future vehicle characteristics can be predicted and accounted for relative to the nominal values of future road segments.

FIG. 7 is a graph 700 illustrating how future vehicle characteristics in the direction that the vehicle is headed, can be predicted and accounted for relative to the nominal and variance values of future road segments. The x-axis represents different road segments and the y-axis represents average characteristics (e.g., speeds) for each road segment. The dot 705A represents the present vehicle characteristic (i.e., speed), and the dots 705B-705F represent the predicted vehicle characteristic. This example could represent six road segments before, during, and after a turn in the road where speeds decrease until the road segment at 705D, then vehicles speeds increase for road segments beyond 705D. The line 710 connects the nominal values associated with each road segment, and the lines 715A and 715B connect the positive and negative standard deviations, respectively, for each the nominal values. The nominal values 710 and standard deviations 715A, 715B may be based on historical data, as discussed above.

As shown in the example graph 700, the second and third predicted vehicle speeds 705C, 705D will be more than one standard deviation above the nominal speed 710. Recognizing this, the vehicle system 105 may select and apply an appropriate correction factor to reduce the speed of the host vehicle 100 prior to reaching the road segments corresponding to the second and third predicted vehicle speeds 705C, 705D so that the actual vehicle speed will be within one standard deviation of the nominal value 710 by the time the host vehicle 100 actually reaches those road segments.

Figure 8:
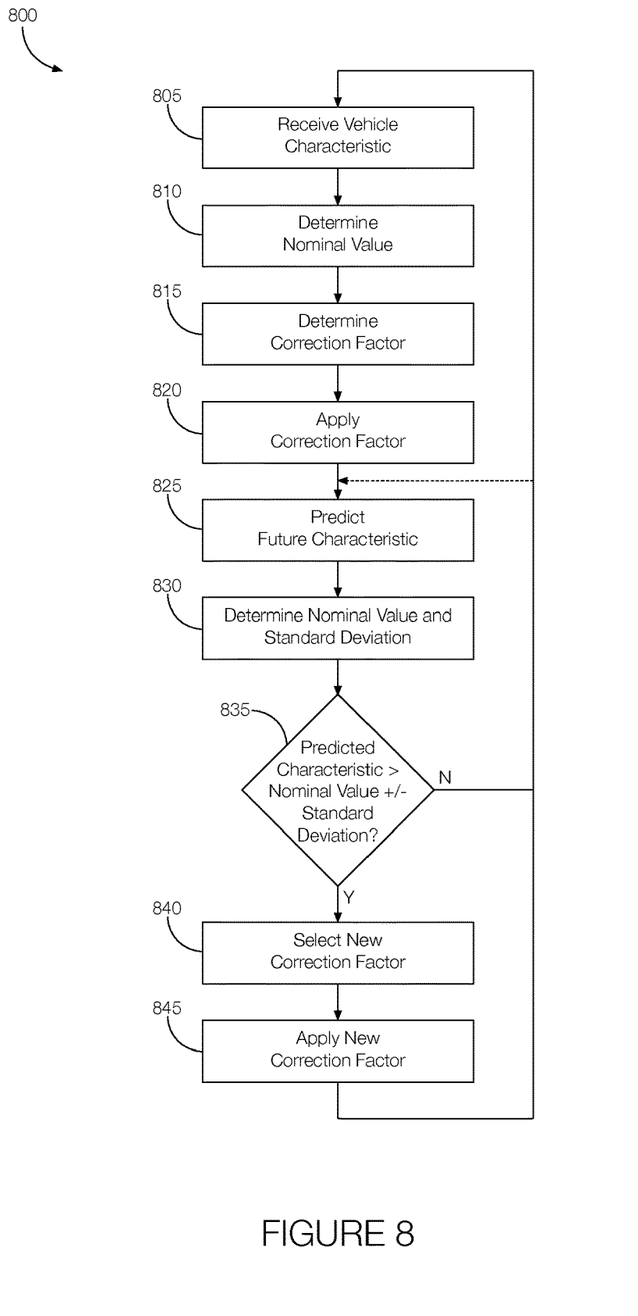
FIG. 8 is a flowchart of an example process that may be executed by the vehicle system to use crowd-sourced data about road segments to autonomously control the vehicle.

FIG. 8 is a flowchart of an example process 800 that may be executed by the vehicle system 105 to use crowd-sourced data about road segments to autonomously control the vehicle. The process 800 may be initiated any time the host vehicle 100 is operating in an autonomous mode. Further, the process 800 may repeat so long as the host vehicle 100 is operating in the autonomous mode.

At block 805, the vehicle system 105 may receive the vehicle characteristic. The vehicle characteristic may be received from one or more vehicle subsystems 130 and may include, e.g., a vehicle speed. The vehicle characteristic may be received by the data storage medium 120, the processing circuit 125, or both. In one possible implementation, the received vehicle characteristic includes a present vehicle characteristic, such as the present speed of the host vehicle 100.

At block 810, the vehicle system 105 may determine the nominal value for the vehicle characteristic received at block 805. Determining the nominal value may include receiving the nominal value from a remote server 110. For instance, the vehicle system 105 may query the remote server 110 for the nominal value based on the present location or a future location of the host vehicle 100. The remote server 110 may transmit the nominal value or historical data to the vehicle system 105. The communications device may receive the nominal value or historical data and store the nominal value or historical data in the data storage medium 120. The processing circuit 125 may access the nominal value from the data storage medium 120. Alternatively, the processing circuit 125 may determine the nominal value from the historical data. Moreover, the remote server 110 may transmit the standard deviation associated with the nominal value to the vehicle system 105 along with the nominal value. Alternatively, the processing circuit 125 may determine the standard deviation from the historical data.

At block 815, the vehicle system 105 may determine a correction factor. The correction factor may be a non-linear function of the variance. For instance, the correction factor for a relatively high variance (e.g., >80%) may cause the host vehicle 100 to quickly decelerate toward the nominal value while the correction factor for a relatively low variance (e.g., <10%) may cause the host vehicle 100 to decelerate slowly toward the nominal value. The processing circuit 125 may determine the correction factor, therefore, based on the variance. The variance may be determined from, e.g., the present vehicle characteristic, the nominal value, and the standard deviation as shown in Equation (1).

At block 820, the vehicle system 105 may apply the correction factor. For instance, the processing circuit 125 may apply the correction factor by, e.g., outputting a control signal to one or more vehicle subsystems 130, such as the autonomous mode controller 135. The control signal may be used to autonomously operate the host vehicle 100 in accordance with the nominal value, which as discussed above is crowd-sourced from other vehicles that have previously driven on the same road segment as the present location of the host vehicle 100.

At block 825, the vehicle system 105 may predict one or more future vehicle characteristics at one or more road segments ahead of the host vehicle 100. For example, the processing circuit 125 may predict the vehicle speed for the next one, two, or more road segments in the path of the host vehicle 100. The vehicle speed may be predicted from the present vehicle speed, how quickly the host vehicle 100 is accelerating or braking, and the distance to each road segment.

At block 830, the vehicle system 105 may determine the nominal value and standard deviation for the next few road segments in the path of the host vehicle 100, or at least the road segments corresponding to the predicted vehicle characteristics determined at block 825. The nominal values and standard deviations may be received from the remote server 110 or determined from historical data, which may also be received from the remote server 110.

At decision block 835, the vehicle system 105 may determine whether any of the predicted vehicle characteristics exceed any of the nominal values for the upcoming road segments. In one possible approach, the vehicle system 105 may determine whether any of the predicted vehicle characteristics will exceed the nominal value for their respective road segment by more than one standard deviation. The decisions at block 835 may be made by the processing circuit 125. If one of the predicted vehicle characteristics will be more than one standard deviation away from the nominal value, the process 800 may proceed to block 840. Otherwise, the process 800 may return to block 805 or 825.

At block 840, the vehicle system 105 may select a new correction factor. The processing circuit 125, for instance, may select a correction factor that will cause the host vehicle 100 to operate at or near the nominal value (e.g., within one standard deviation) at each upcoming road segment.

At block 845, the vehicle system 105 may apply the new correction factor. That is, the processing circuit 125 may apply the new correction factor by, e.g., outputting a control signal to one or more vehicle subsystems 130, such as the autonomous mode controller 135. The control signal may be used to autonomously operate the host vehicle 100 in accordance with the nominal and variance value at each road segment.

The process 800 may return to block 805 or 825 so that the host vehicle 100 can continue to be autonomously controlled in accordance with the crowd-sourced nominal values.

By controlling the host vehicle 100 from crowd-sourced data, the vehicle system 105 may cause the host vehicle 100 to autonomously operate as if it were being driven by a human driver, that has prior knowledge of the road ahead. Thus, the human-operated driving style may improve the vehicle response and make passengers more comfortable while the host vehicle 100 is operating in an autonomous mode.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computing device comprising:
   a data storage medium; and
   a processing circuit programmed to receive from the data storage medium, a vehicle characteristic associated with an autonomous host vehicle, receive historical data associated with the vehicle characteristic at a first road segment, determine a correction factor to apply to the vehicle characteristic based at least in part on the historical data, and apply the correction factor to the vehicle characteristic to operate the autonomous host vehicle in accordance with the historical data,
   wherein the correction factor is an amount of correction applied to adjust the vehicle characteristic to a nominal value and wherein the nominal value is crowd-sourced from vehicles other than the autonomous host vehicle, and
   wherein the correction factor is a non-linear function of a variance factor, wherein the variance factor is a difference between a magnitude of the vehicle characteristic and the nominal value.

2. The vehicle computing device of claim 1, wherein the processing circuit is programmed to determine the nominal value and a standard deviation of the historical data associated with the first road segment.

3. The vehicle computing device of claim 2, wherein the processing circuit is programmed to determine the variance factor in accordance with the nominal value and the standard deviation.

4. The vehicle computing device of claim 2, wherein the magnitude of the vehicle characteristic includes a magnitude value associated with at least one of a speed control and a steering control, and wherein the processing circuit is programmed to determine the variance factor, at least in part, by comparing the magnitude value to the nominal value.

5. The vehicle computing device of claim 4, wherein the processing circuit is programmed to determine the variance factor, at least in part by comparing the magnitude value to a standard deviation associated with the nominal value and the first road segment.

6. The vehicle computing device of claim 2, wherein the processing circuit is programmed to receive the nominal value from a remote server.

7. The vehicle computing device of claim 1, wherein the processing circuit is programmed to receive historical data associated with the first road segment from a remote server, and wherein the processing circuit is programmed to determine the nominal value from the historical data.

8. The vehicle computing device of claim 1, wherein the vehicle characteristic includes a present vehicle characteristic and wherein the processing circuit is programmed to predict a future vehicle characteristic based at least in part on the present vehicle characteristic.

9. The vehicle computing device of claim 8, wherein the nominal value is one of a first nominal value and a second nominal value, wherein the historical data for the vehicle characteristic at the first road segment includes the first nominal value, and wherein the processing circuit is programmed to receive historical data including the second nominal value for the vehicle characteristic at a second road segment and determine the correction factor based at least in part on the future vehicle characteristic and the second nominal value.

10. A method comprising:
receiving a vehicle characteristic associated with an autonomous host vehicle;
receiving historical data of distributed vehicle characteristics;
determining a nominal value from the historical data, wherein the nominal value is collected from other vehicles and is associated with a first road segment;
determining a correction factor to apply to the vehicle characteristic based at least in part on the historical data, wherein the correction factor is a non-linear function of a variance factor, wherein the variance factor is a difference between a magnitude of the vehicle characteristic and the nominal value; and
applying the correction factor to the vehicle characteristic to autonomously operate the autonomous vehicle in accordance with the historical data, wherein the correction factor is an amount of correction applied to adjust the vehicle characteristic to the nominal value.

11. The method of claim 10, further comprising determining the nominal value and a standard deviation based on the historical data associated with the first road segment.

12. The method of claim 11, wherein the variance factor is determined in accordance with the nominal value and standard deviation.

13. The method of claim 11, wherein the vehicle characteristic includes a magnitude value, and wherein the variance factor is determined, at least in part, by comparing the magnitude value to the nominal value.

14. The method of claim 13, wherein the variance factor is determined, at least in part, by comparing the magnitude value to a standard deviation associated with the nominal value and the first road segment.

15. The method of claim 10, wherein the historical data is received from a remote server.

16. The method of claim 10, wherein the historical data associated with the first road segment is received from a remote server, and wherein the nominal value is determined from the historical data.

17. The method of claim 10, wherein receiving the vehicle characteristic includes receiving a present vehicle characteristic.

18. The method of claim 17, further comprising predicting a future vehicle characteristic based at least in part on the present vehicle characteristic.

19. The method of claim 18, wherein the nominal value is one of a first nominal value and a second nominal value, the method further comprising:
determining the first nominal value associated with the first road segment based on the historical data.

20. The method of claim 19, further comprising:
determining the second nominal value for the vehicle characteristic at a second road segment based at least in part on historical data associated with the second road segment; and
determining the correction factor based at least in part on the future vehicle characteristic and the second nominal value.

* * * * *